United States Patent
Cheng et al.

(10) Patent No.: US 8,743,313 B2
(45) Date of Patent: Jun. 3, 2014

(54) FLAT PANEL DISPLAY AND METHOD FOR ASSEMBLING THE FLAT PANEL DISPLAY

(71) Applicant: AmTran Technology Co., Ltd, New Taipei (TW)

(72) Inventors: I-Chen Cheng, New Taipei (TW); Hung-Tse Wang, New Taipei (TW)

(73) Assignee: AmTran Technology Co., Ltd., Jhonghe District, New Taipei (TW)

(*) Notice: Subject to any disclaimer, the term of this patent is extended or adjusted under 35 U.S.C. 154(b) by 0 days.

(21) Appl. No.: 13/948,134

(22) Filed: Jul. 22, 2013

(65) Prior Publication Data

US 2013/0308341 A1 Nov. 21, 2013

Related U.S. Application Data

(62) Division of application No. 12/949,740, filed on Nov. 18, 2010, now Pat. No. 8,659,716.

(30) Foreign Application Priority Data

Jun. 8, 2010 (TW) .............................. 99118558 A

(51) Int. Cl.
*G02F 1/13357* (2006.01)
*H01J 9/00* (2006.01)
*F21V 8/00* (2006.01)

(52) U.S. Cl.
USPC ................. 349/58; 349/60; 349/65; 445/24; 362/612

(58) Field of Classification Search
USPC .................... 349/58, 60, 61, 65, 187; 445/24; 362/612, 632, 633, 634, 97.2, 97.3
See application file for complete search history.

(56) References Cited

U.S. PATENT DOCUMENTS

| | | | |
|---|---|---|---|
| 2004/0196413 A1* | 10/2004 | Satonaka | 349/58 |
| 2005/0151894 A1* | 7/2005 | Katsuda et al. | 349/58 |
| 2008/0303977 A1 | 12/2008 | Sekiguchi | |
| 2009/0207126 A1* | 8/2009 | Arisato et al. | 345/102 |
| 2009/0322981 A1 | 12/2009 | Hung | |

* cited by examiner

*Primary Examiner* — Dung Nguyen
*Assistant Examiner* — Tai Duong
(74) *Attorney, Agent, or Firm* — Winston Hsu; Scott Margo

(57) ABSTRACT

A front frame of a flat panel display having positioning structure allows a LCD cell to be positioned and mounted thereon along an assembly direction. A restraining frame may be further incorporated for positioning and spacing purposes for each component of the display. Optical films, a light guide component, a backlight unit, and a reflector of the flat panel display are then mounted in a row along the assembly direction on the restraining frame or the front frame, where the backlight unit and/or the reflector may be fixed to a back cover of the backlight module in advance. Finally, a speaker, wiring of the display, circuit boards, and a board cover are assembled to the front frame and the back cover.

9 Claims, 17 Drawing Sheets

FLAT PANEL DISPLAY AND METHOD FOR ASSEMBLING THE FLAT PANEL DISPLAY

CROSS REFERENCE TO RELATED APPLICATIONS

This is a division of U.S. patent application Ser. No. 12/949,740, filed Nov. 18, 2010.

BACKGROUND OF THE INVENTION

1. Field of the Invention

The invention relates to a flat panel display and a method for assembling the flat panel display, and more particularly, to a flat panel display with all its components assembled along a single direction and a method for assembling the flat panel display.

2. Description of the Prior Art

Modern assembly process of a flat panel display includes three stages. The first stage is assembling a backlight unit, the second stage is assembling a liquid crystal module (LCM) unit, and the final stage is assembling the entire flat panel display. After the backlight component is assembled with other components, such as optical films or light guide components, to form the backlight unit in the backlight unit plant, the backlight unit is then sent to the panel plant and assembled into the LCM unit. Due to the demand of the assembly, a liquid crystal cell is added on the backlight unit under the condition that the display side faces upwards, where there are many positioning structures for positioning the liquid crystal cell configured on a rubber frame or a front frame of the backlight unit. Afterwards, the metal front frame is fixed to the LCM unit, and then the semi-finished LCM unit is turned upside down so a back cover can be fixed thereon to finish the second stage. In the flat panel display plant, the display side of the finished LCM unit is turned upward again, so the LCM unit and a front frame of the flat panel display can be assembled. Afterwards, the semi-finished flat panel display is turned upside down again, so a board and a back cover of the flat panel display are fixed to the back cover of the LCM unit. Finally, a support stand is assembled thereon to finish the entire flat panel display.

During the above-mentioned assembly process, the flat panel display is required to be turned over again and again. Since the trend of flat panel display is toward to large-size, the conventional assembly process will need more manpower and the difficulties of assembly will be increased. Besides, the conventional three-stage assembly process of the flat panel displays takes too much time and results in a bottleneck of man-hour productivity. Therefore, an important research topic of the flat panel display assembly process is how to integrate the aforesaid three stages and avoid turning the flat panel display over in order to shorten the production line, improve the production efficiency, and simplify the components required by the flat panel display to lower the production costs.

SUMMARY OF THE INVENTION

The present invention provides a flat panel display. The flat panel display includes a front frame, a panel unit, a plurality of optical films, a backlight unit, and a back cover. The front frame includes a first positioning member and a second positioning member. The first positioning member and the second positioning member are arranged along an assembly direction. The panel unit is mounted along the assembly direction into the front frame and fixed by the first positioning member. The plurality of optical films is fixed along the assembly direction to the second positioning member of the front frame. The backlight unit is fixed to the back cover. The back cover and the backlight unit are fixed to the front frame along the assembly direction.

The present invention also provides a method for assembling a flat panel display. The method includes steps of: mounting a panel unit into a front frame along an assembly direction; fixing a plurality of optical films into a second positioning member of the front frame along the assembly direction; and fixing a back cover comprising a backlight unit to the front frame along the assembly direction. The first positioning member and the second positioning member are arranged along the assembly direction.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
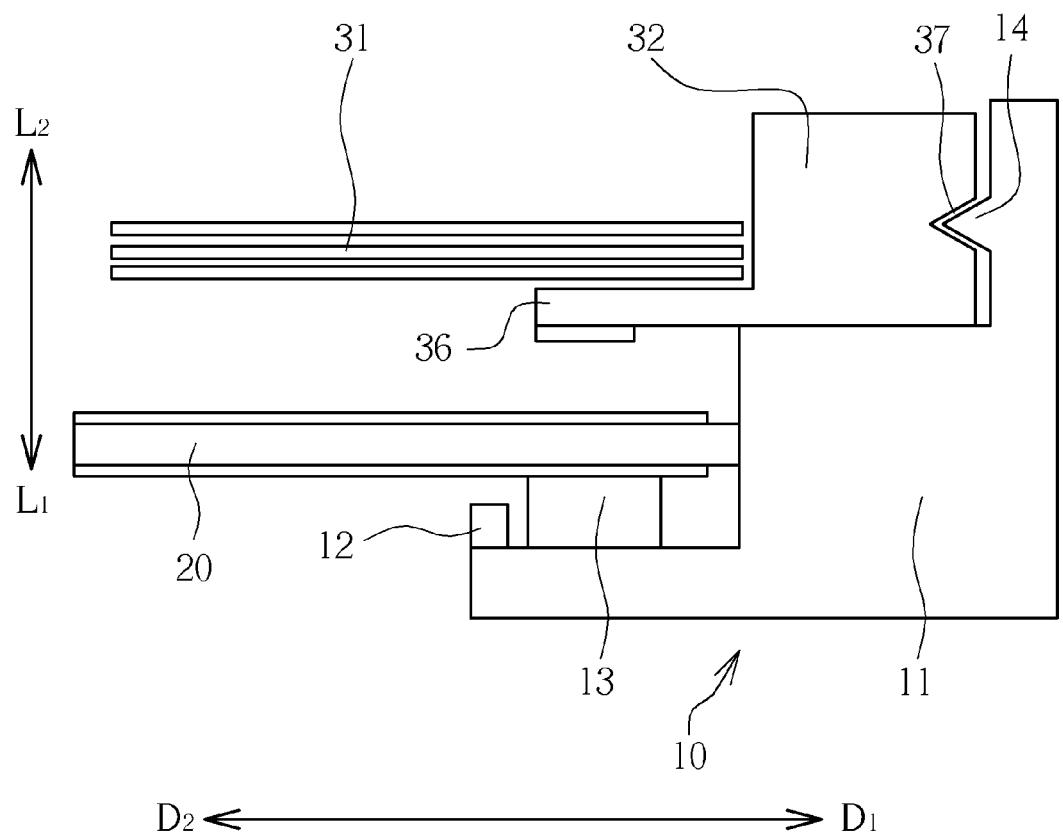
Figure 3:
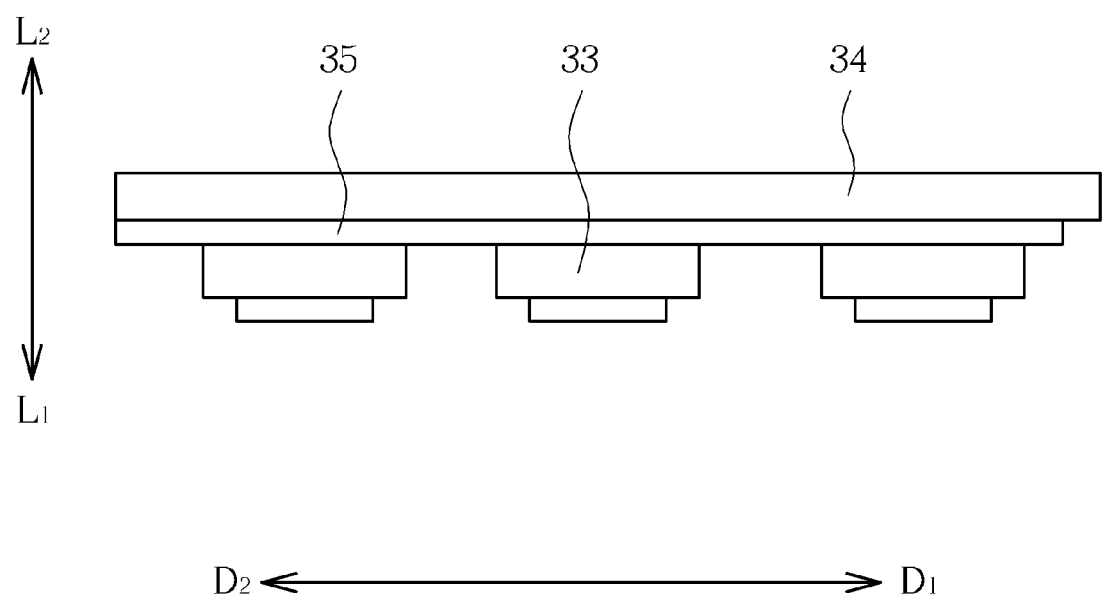
Figure 4:
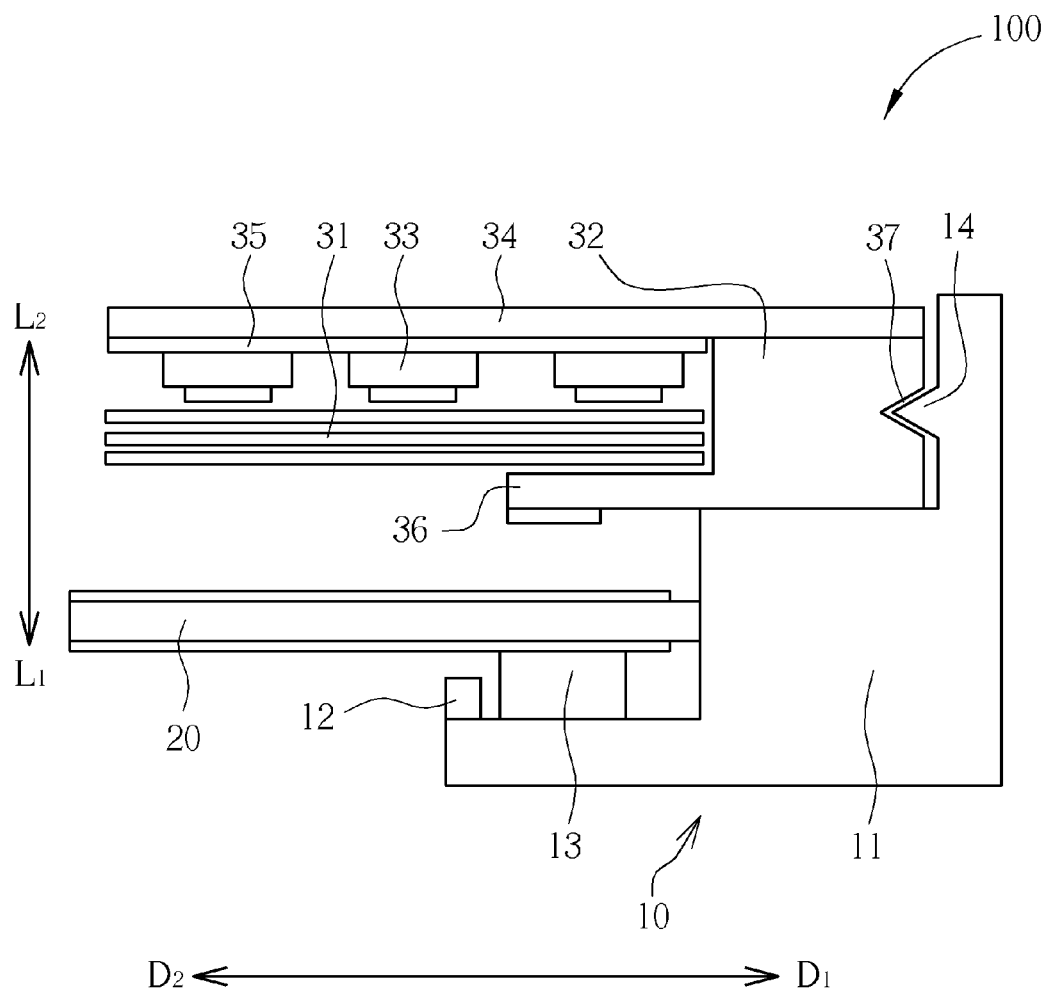

Please refer to FIG. 1 to FIG. 4, FIG. 1 to FIG. 4 are schematic diagrams of side sectional view of a first embodiment of a flat panel display 100 of the present invention and an assembly process thereof. As shown in FIG. 1 to FIG. 4, the present invention the provides specific structures of flat panel display 100 and an improved assembly process to integrate the aforesaid three stages and avoid to turn the flat panel display 100 over in order to shorten the production line and improve the production efficiency. As shown in FIG. 4, the display surface, which is the panel unit 20 in FIG. 4, of the flat panel display 100 faces downward (i.e. $L_1$ direction in FIG. 4) for assembly. The flat panel display 100 includes a front frame 10, the panel unit 20, such as the cell, a restraining frame 32, a plurality of optical films 31, a backlight unit 33, a reflective film 35, a back cover 34, a speaker, a wiring, and circuit boards (including control circuit board and power supply circuit board), and so on. The speaker, the wiring, and the circuit boards (and a board cover) are not shown in FIG. 4, and the assembly of them is well known in the art, so it is not necessary to describe in detail here.

Figure 1:
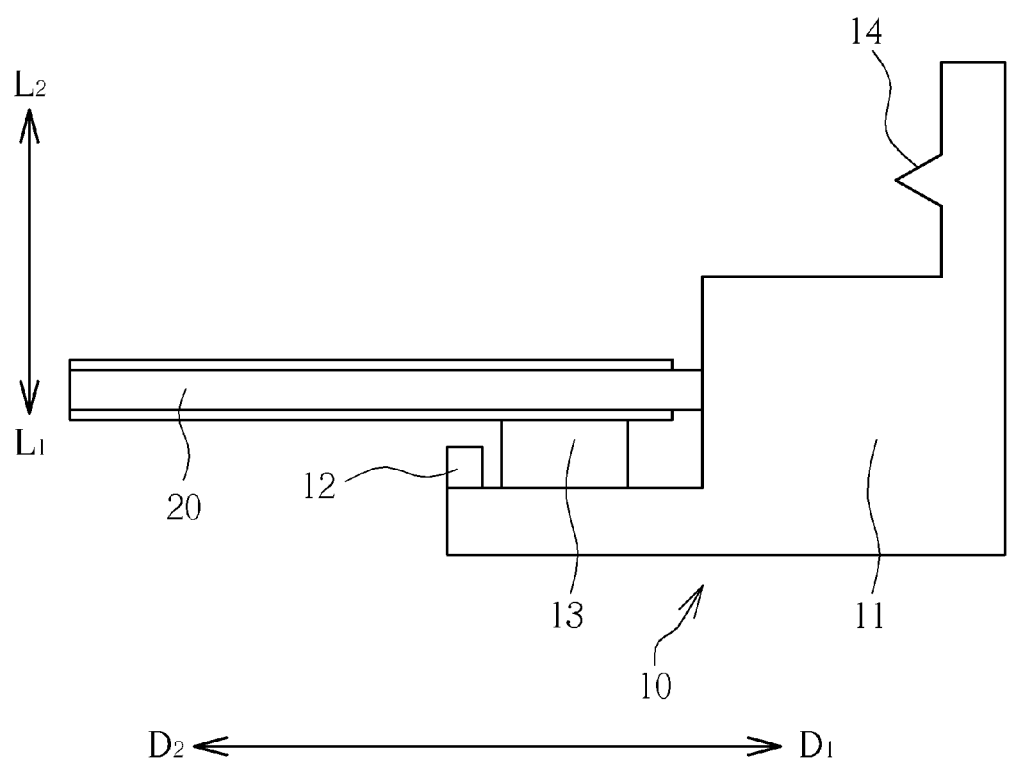
FIG. 1 to FIG. 4 are schematic diagrams of side sectional view of a first embodiment of a flat panel display of the present invention and an assembly process thereof.

From FIG. 1 to FIG. 4, all components of the flat panel display 100 are assembled downward sequentially along an assembly direction (the $L_1$ direction). And the steps of the assembly process are simplified so the production efficiency could be improved. As shown in FIG. 1, the front frame 10 is facing downward and disposed firstly. The inner side of the front frame 10 has a first positioning member 11. The first positioning member 11 can be any positioning structure, such as a block extending from the inner side of the front frame 10, or a positioning bolt, a screw, a latch, and so on, which is fixed on the front frame 10. It should be noted that the FIG. 1 (and each figure of all embodiments) shows just one side of the flat panel display 100, and the opposing side of the flat panel display 100 with the same structure is not shown. The first positioning member 11 forms a span opening along a horizontal direction, which is the $D_1D_2$ direction in FIG. 1 to FIG. 4, for accommodating the panel unit 20. The panel unit 20 is mounted along the L1 direction into the front frame 10 and fixed by the first positioning member 11, as shown in FIG. 1. A cushion pad 13 is disposed between the panel unit 20 and the front frame 10 (preferably attached on the front frame 10 or the panel unit 20 in advance). When the panel unit 20 is mounted along the $L_1$ direction into the front frame 10, the cushion pad 13 provides a cushion function to prevent damages of the panel unit 20 from hitting the front frame 10. The front frame 10 further includes a shade pad 12 to prevent lights leaking from the side of the display, so as to improve the output quality.

As shown in FIG. 2, the restraining frame 32 is then mounted along the $L_1$ direction onto the front frame 10, wherein the restraining frame 32 is specifically mounted onto the first positioning member 11 in this embodiment. Since the span opening formed by the restraining frame 32 along the horizontal direction is larger than the span opening formed by the first positioning member 11, the restraining frame 32 can be disposed on the first positioning member 11 and a certain distance away from the underlying panel unit 20. The restraining frame 32 has first engaging portions 37 at its four sides, which are slots in this embodiment, wherein the first engaging portions 37 are utilized to engage with second engaging portions 14, which are hooks in this embodiment, located at corresponding positions of the front frame 10 such that the restraining frame 32 can be mounted and fixed onto the front frame 10. Once the restraining frame 32 is mounted onto the front frame 10, it provides sufficient support for components stacking thereon and also provides the necessary space to the optical mechanism. The plurality of optical films 31 are then disposed along the $L_1$ direction onto arms 36 of the restraining frame 32.

As shown in FIG. 3, a backlight unit 33, which is a direct-type light emitting diode herein, and the reflective film 35 are fixed to the back cover 34 in advance. As shown in FIG. 4, the back cover 34 with the backlight unit 33 and the reflective film 35 is then fixed to the restraining frame 32 along the $L_1$ direction. Finally, the speaker, the wiring, and the circuit boards (with the board cover), which are not shown in the figures, are attached to the front frame 10 and the back cover 34 along the very same direction, i.e., the $L_1$ direction when the display surface of the panel unit 20 keeps facing downward, so as to complete the assembly processes of the flat panel display 100.

Figure 5:
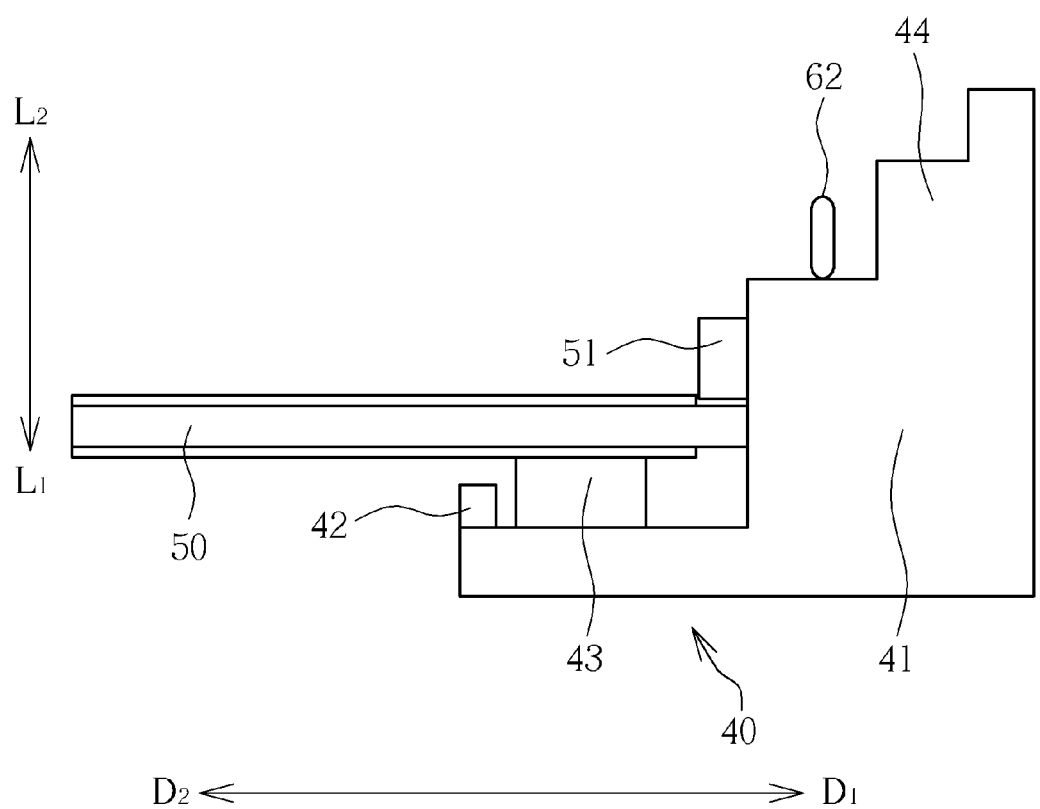
FIG. 5 to FIG. 7 are schematic diagrams of side sectional view of a second embodiment of a flat panel display of the present invention and an assembly process thereof.
Figure 6:
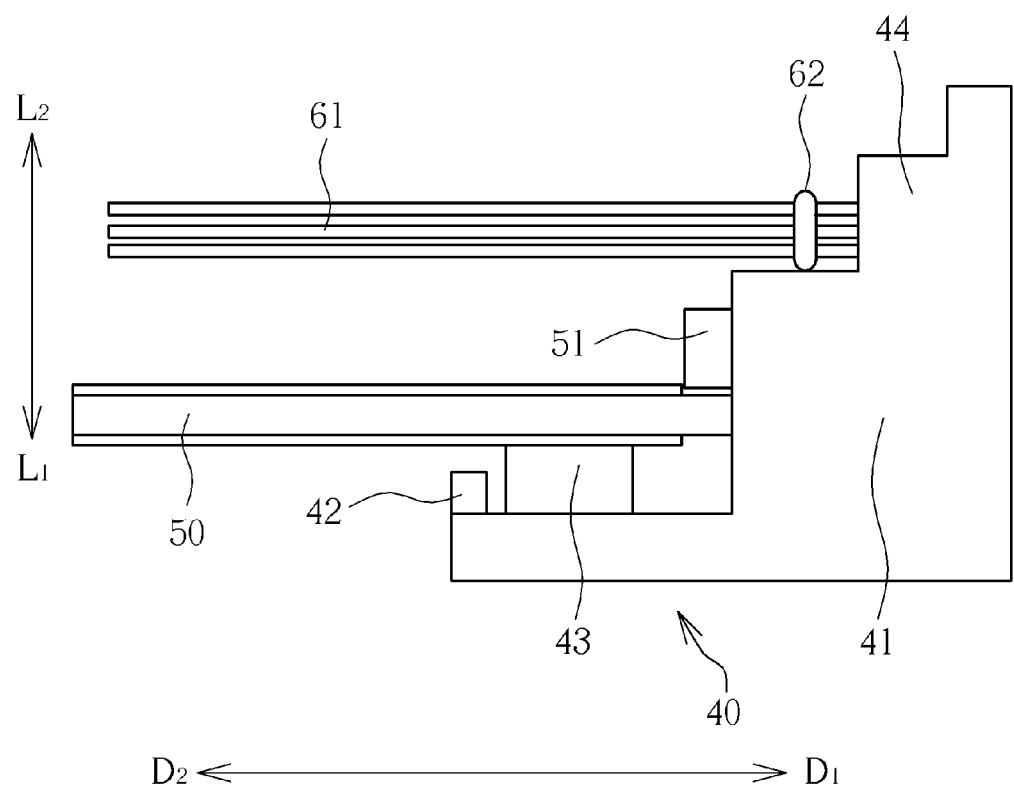
Figure 7:
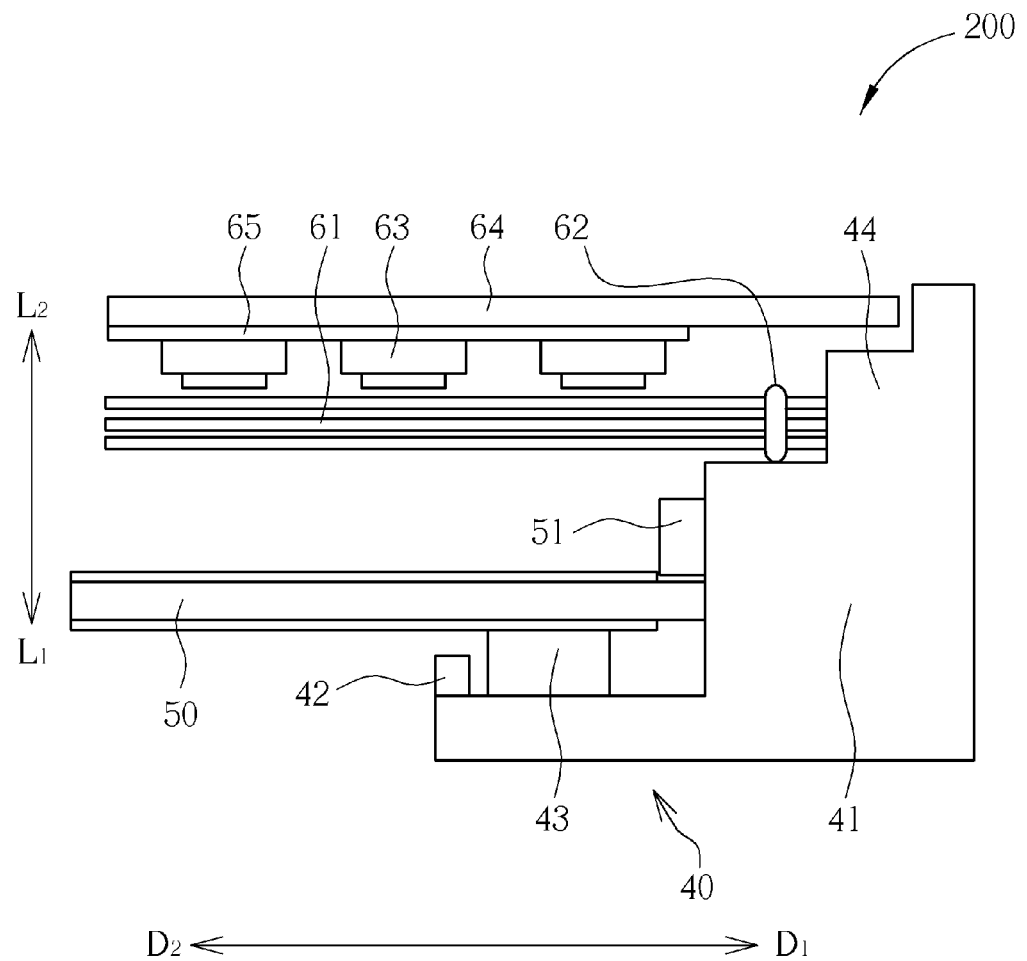

Please refer to FIG. 5 to FIG. 7. FIG. 5 to FIG. 7 are schematic diagrams of side sectional view of a second embodiment of a flat panel display 200 in the present invention and an assembly process thereof. The FIG. 5 to FIG. 7 discloses an alternative design of the front frame in the flat panel displays with the direct-type backlight units and the assembly method thereof. As shown in FIG. 5, the first positioning member 41 of the front frame 40, the panel unit 50, the cushion pad 43, and the shade pad 42 of the flat panel display 200 are similar to the first embodiment mentioned above. The front frame 40 further has a second positioning member 44 at its inner sides, as shown in the figures. The first positioning member 41 and the second positioning member 44 are arranged as step-shaped along the $L_2$ direction, the opposite direction of the assembly direction $L_1$. A span opening between the second positioning members 44 of opposing sides along a horizontal direction, the $D_1D_2$ direction, is larger than the span opening of the first positioning members 41. Therefore, optical films 61 can be directly disposed between the second positioning members 44 along the $L_1$ direction as shown in FIG. 6. Since the optical films 61 are disposed onto the first positioning member 41, the necessary space of the optical mechanism is provided between the optical films 61 and the panel unit 50. A cushion pad 51 is disposed between the panel unit 50 and the optical films 61. The two cushion pads 43, 51 are respectively disposed on two sides of the panel unit 50 to provide the panel unit 50 with an efficient protection from damage. The optical films 61 are fixed onto the first positioning member 41 by a fixing member 62.

As shown in FIG. 7, a back cover 64, a reflective film 65, and a backlight unit 63, similar to the first embodiment, are assembled in advance, and then the back cover 64 is fixed to the front frame 40 along the $L_1$ direction, which is specifically fixed onto the second positioning member 44 of the front frame 40 in this embodiment.

Figure 8:
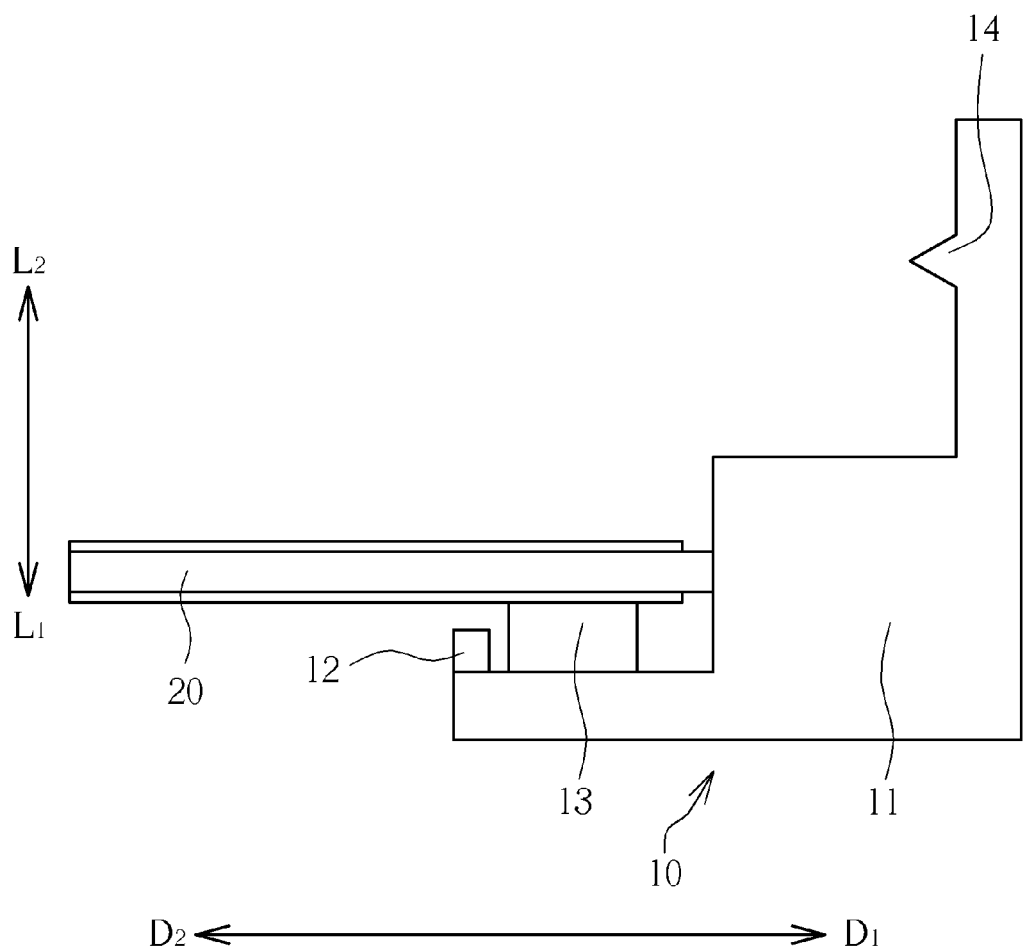
FIG. 8 to FIG. 12 are schematic diagrams of side sectional view of a third embodiment of a flat panel display of the present invention and an assembly process thereof.
Figure 9:
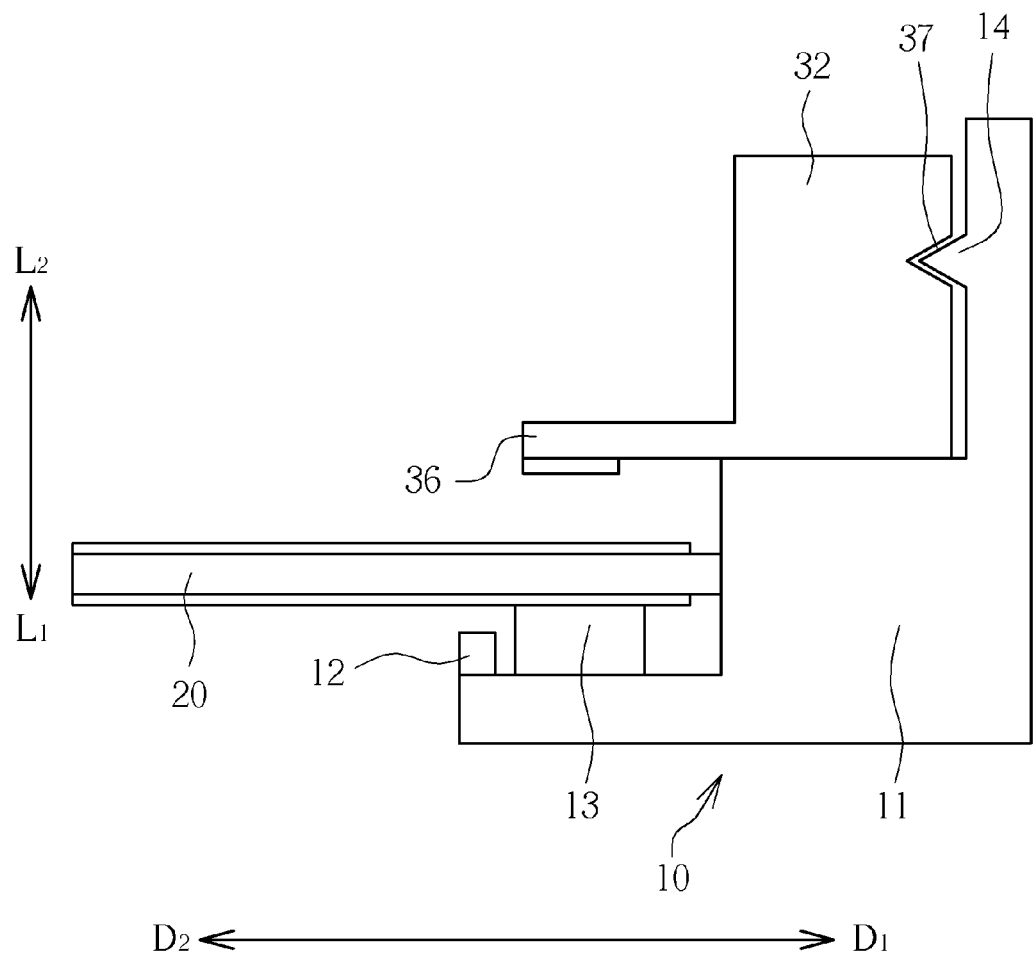
Figure 10:
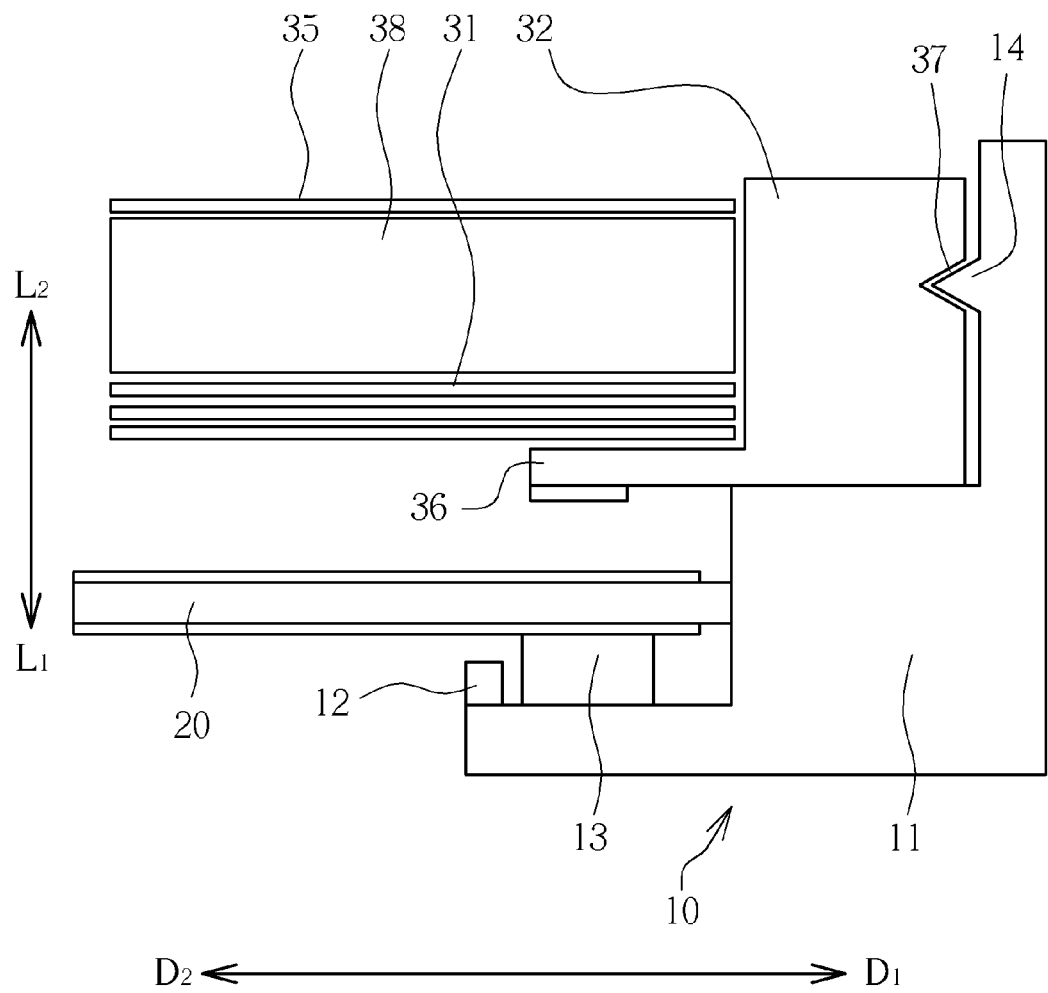
Figure 11:
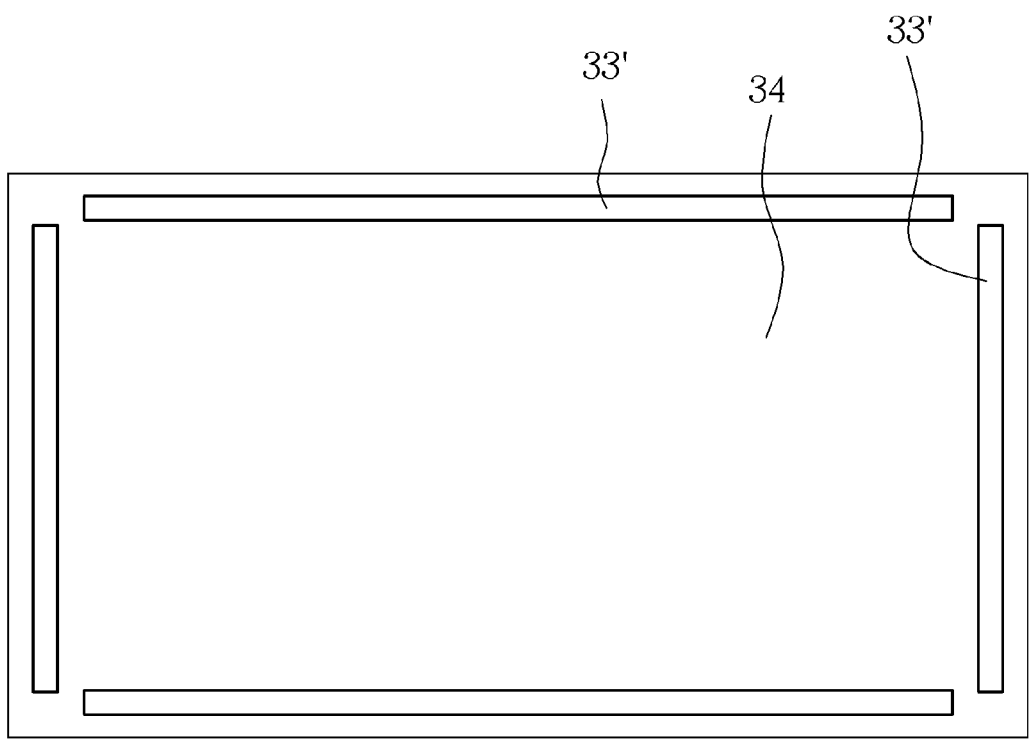
Figure 12:
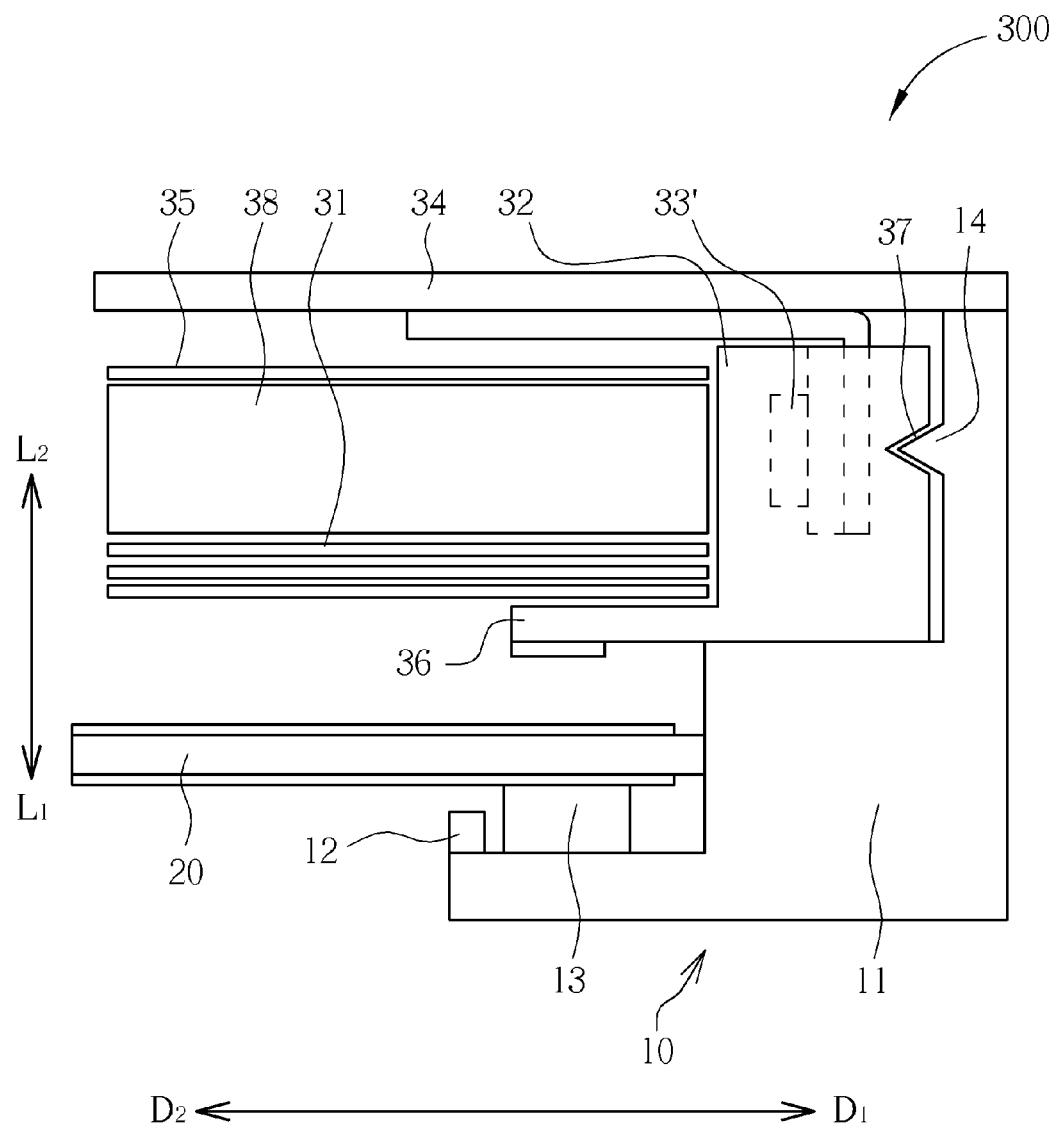

Please refer to the FIG. 8 to FIG. 12, which are schematic diagrams of side sectional view of a third embodiment of a flat panel display 300 in the present invention and an assembly process thereof. A side-type backlight unit utilized in the flat panel display 300 is shown in the third embodiment, which is different from the direct-type backlight units in the above-mentioned embodiments. Components and assembly stages shown in FIG. 8 and FIG. 9 are similar to the first embodiment and thus they are not described in detail here. As shown in FIG. 10, after the optical films 31 are disposed along the $L_1$ direction onto the arm 36, a light guide component 38 working with the side-type backlight unit 33' and the reflective film 35 are disposed along the $L_1$ direction onto the plurality of optical films 31 sequentially. Then the side-type backlight unit 33' is fixed to the back cover 34. In this embodiment, the side-type backlight unit 33' is a side-light type light emitting diode, which can be disposed on the back cover 34 in a way to emit lights from one side, two opposite sides, or four sides as shown in FIG. 11 (FIG. 11 is a diagram of the back cover 34 fixed with the backlight unit 33'). As shown in FIG. 12, the back cover 34 is fixed to the restraining frame 32, or to the front frame 10 directly. In this assembly stage, the backlight unit 33' is inserted into a proper opening of the restraining frame 32 for side-type light source configuration.

Figure 13:
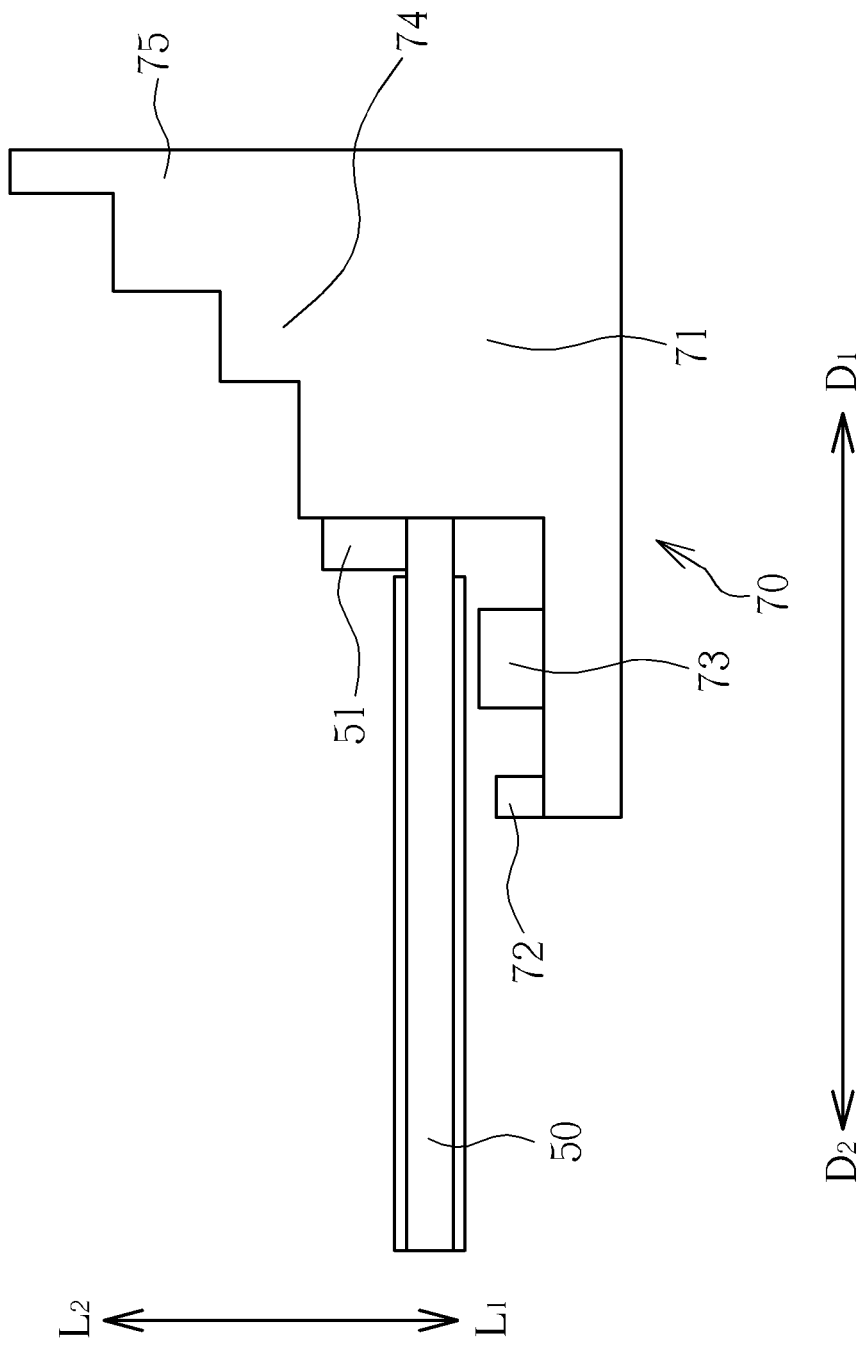
FIG. 13 to FIG. 15 are schematic diagrams of side sectional view of a fourth embodiment of a flat panel display of the present invention and an assembly process thereof.
Figure 14:
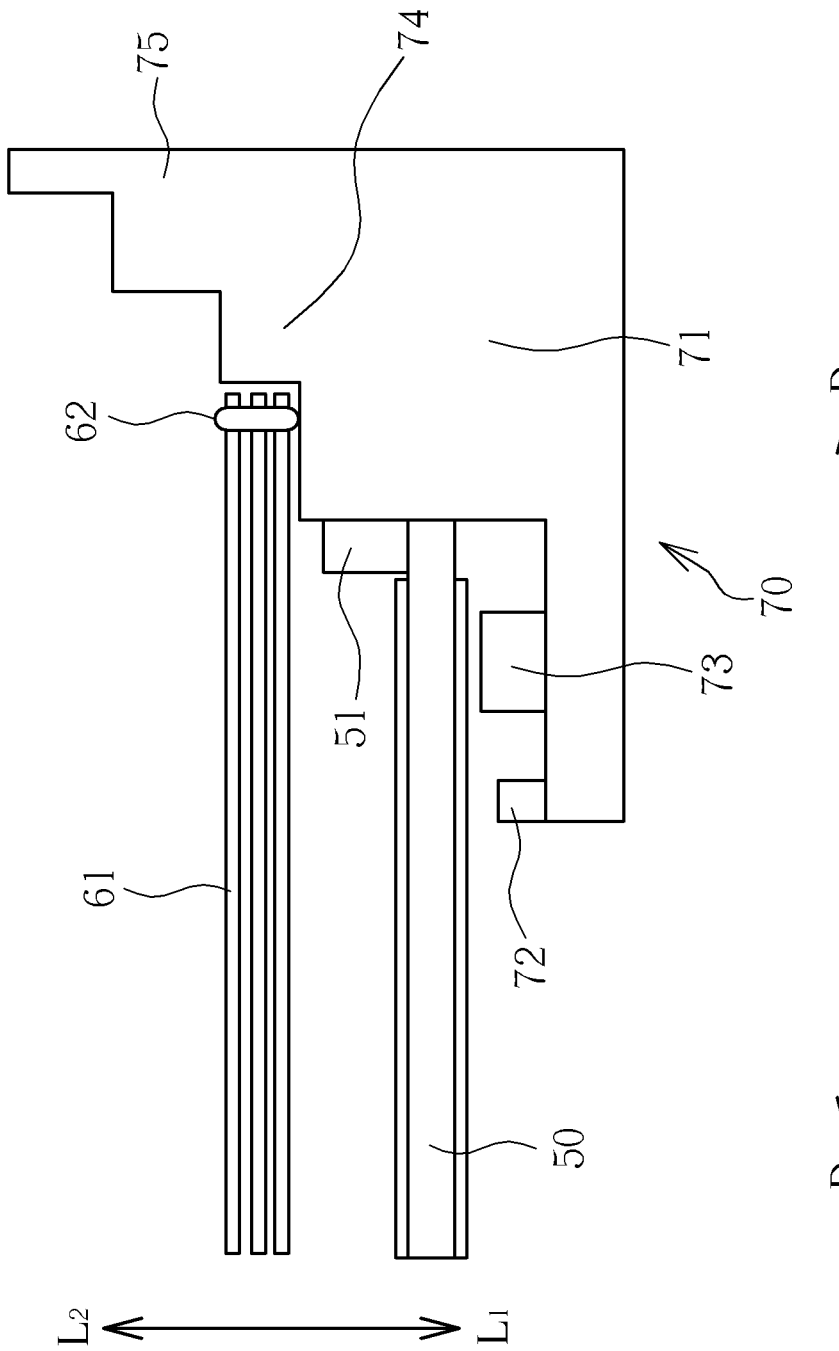
Figure 15:
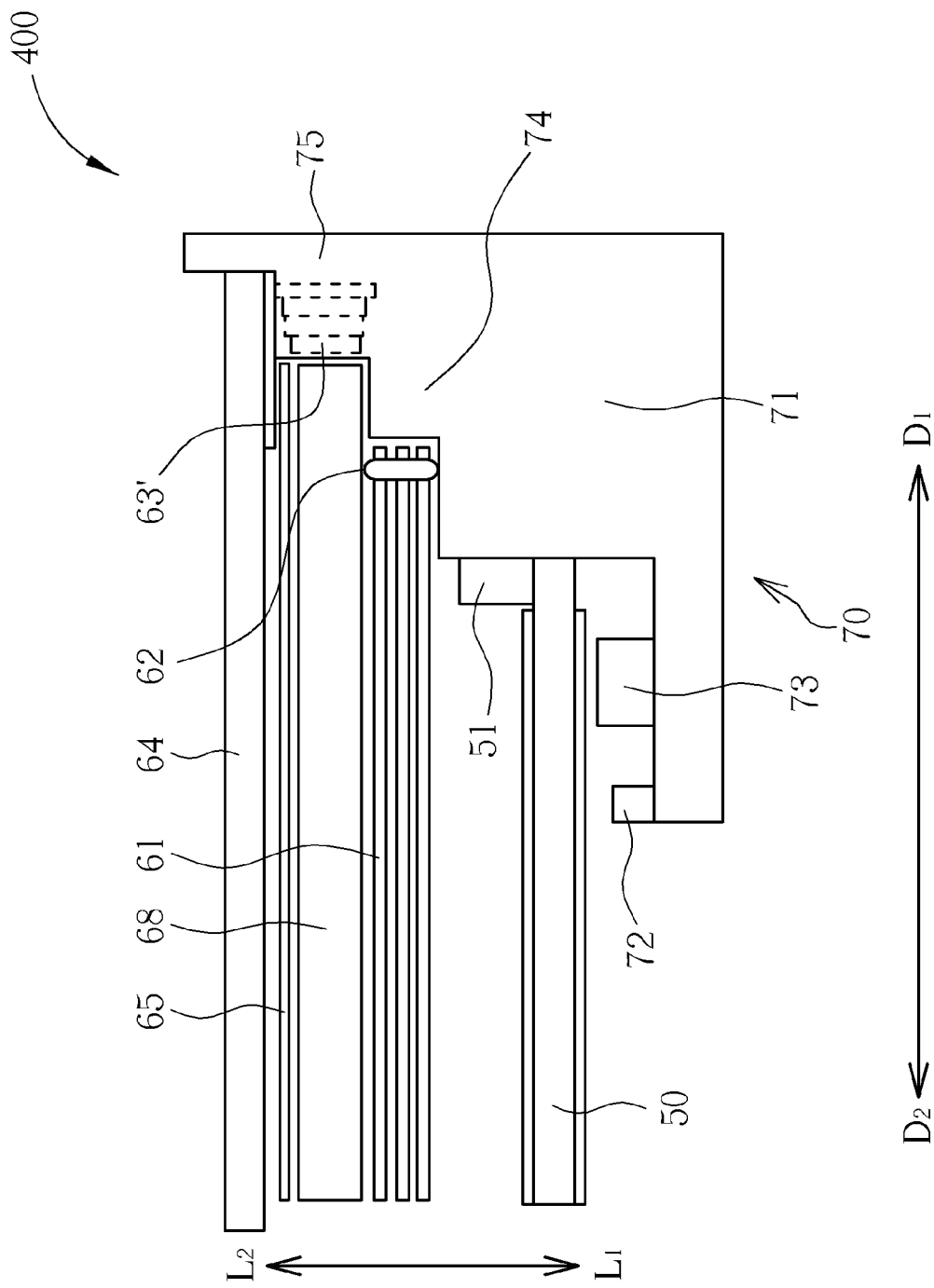

Please refer to FIG. 13 to FIG. 15, FIG. 13 to FIG. 15 are schematic diagrams of side sectional view of a fourth embodiment in the present invention and an assembly process thereof. The flat panel display 400 of the fourth embodiment also has side-type backlight units. The front frame 70 including the first positioning member 71 and the second positioning member 74, the panel unit 50, two cushion pads 51, 73, the shade pad 72, and the optical films 61, of the flat panel display 400, and the assembly process thereof, as shown in FIG. 13 and FIG. 14, are similar to the aforesaid second embodiment, therefore they are not necessary to be described in detail here. The front frame 70 of the fourth embodiment further includes a third positioning member 75. The first positioning member 71, the second positioning member 74, and the third positioning member 75 can be any positioning structure, such as a block extending from the inner sides of the front frame 70, or a positioning bolt, a screw, a latch, and so on, which are arranged in different positions fixed on the front frame 70 along the $L_1L_2$ direction. In this embodiment, the first positioning member 71, the second positioning member 74, and the third positioning member 75 are arranged as step-shaped along the $L_2$ direction opposite to the $L_1$ direction. A span opening between the third positioning members 75 on the opposing sides of the front frame 70 along the horizontal direction, the $D_1D_2$ direction, is larger than the span opening between the second positioning members 74. As shown in FIG. 15, a light guide component 68 and a reflective film 65 are disposed in order along the $L_1$ direction onto the optical films 61. FIG. 15 further shows that the light guide component 68 and the reflective film 65 are disposed onto the second positioning member 74 or in other words, between the third positioning members 75. Therefore, a proper distance between the light guide component 68, the reflective film 65, and the plurality of optical films 61 are provided for the optical mechanism. Then, the back cover 34 is fixed to the front frame 70, or more specifically, to the third positioning member 75 in this embodiment. In this assembly stage, the backlight unit 63' is directly inserted into a proper opening of the third positioning member 75 for side-type light source configuration.

Figure 16:
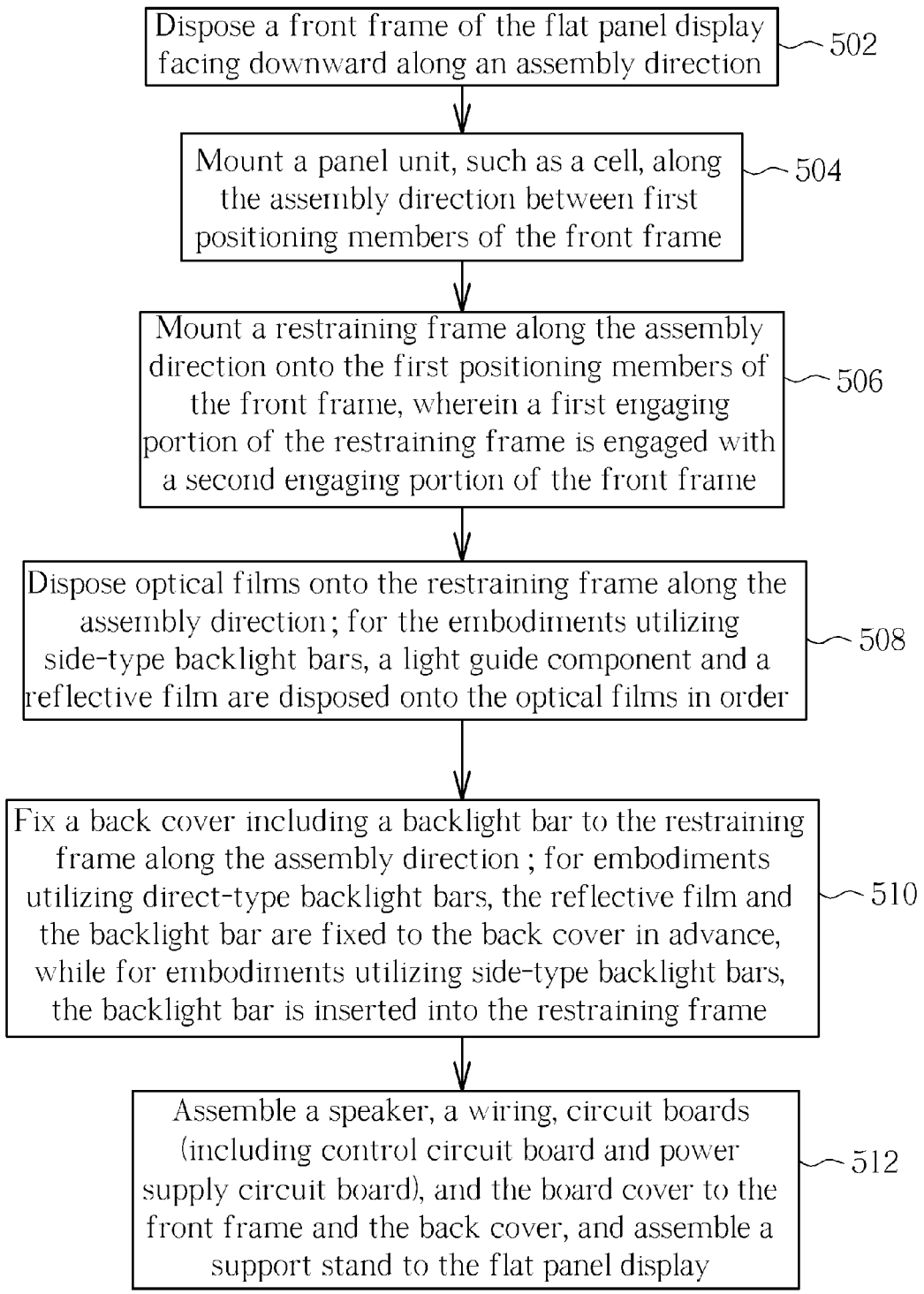
FIG. 16 and FIG. 17 are flow charts of the methods for assembling the flat panel display according to the present invention.
Figure 17:
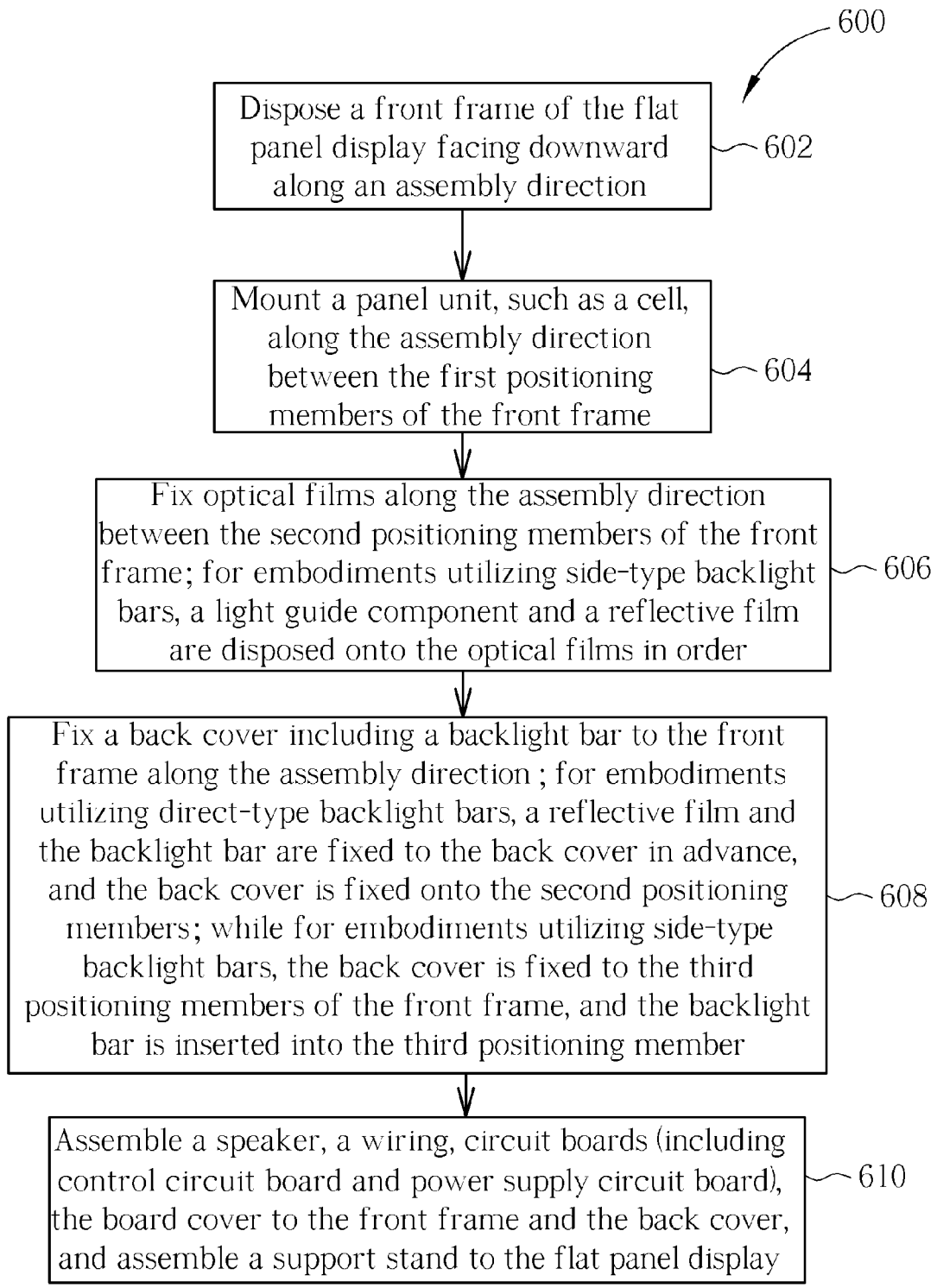

Please refer to FIG. 16 and FIG. 17, which are flow charts of the methods for assembly the flat panel display in the present invention. In FIG. 16, the method 500 includes the following steps:

Step 502: dispose a front frame of the flat panel display facing downward along an assembly direction;

Step 504: mount a panel unit, such as a cell, along the assembly direction between first positioning members of the front frame;

Step 506: mount a restraining frame along the assembly direction onto the first positioning members of the front frame, wherein a first engaging portion of the restraining frame is engaged with a second engaging portion of the front frame;

Step 508: dispose optical films onto the restraining frame along the assembly direction; for the embodiments utilizing side-type backlight units, a light guide component and a reflective film are disposed onto the optical films in order;

Step 510: fix a back cover including a backlight unit to the restraining frame along the assembly direction; for embodiments utilizing direct-type backlight units, the reflective film and the backlight unit are fixed to the back cover in advance, while for embodiments utilizing side-type backlight units, the backlight unit is inserted into the restraining frame;

Step 512: assemble a speaker, a wiring, circuit boards (including control circuit board and power supply circuit board), and the board cover to the front frame and the back cover, and assemble a support stand to the flat panel display.

In FIG. 17, the method 600 includes the following steps:

Step 602: dispose a front frame of the flat panel display facing downward along an assembly direction;

Step 604: mount a panel unit, such as a cell, along the assembly direction between the first positioning members of the front frame;

Step 606: fix optical films along the assembly direction between the second positioning members of the front frame; for embodiments utilizing side-type backlight units, a light guide component and a reflective film are disposed onto the optical films in order;

Step 608: fix a back cover including a backlight unit to the front frame along the assembly direction; for embodiments utilizing direct-type backlight units, a reflective film and the backlight unit are fixed to the back cover in advance, and the back cover is fixed onto the second positioning members; while for embodiments utilizing side-type backlight units, the back cover is fixed to the third positioning members of the front frame, and the backlight unit is inserted into the third positioning member;

Step 610: assemble a speaker, a wiring, circuit boards (including control circuit board and power supply circuit board), the board cover to the front frame and the back cover, and assemble a support stand to the flat panel display.

The method for assembling the flat panel display and the structure of the flat panel display disclosed in the present invention can avoid the repeated turning steps required in the conventional assembly process of LCM unit and remove a metal frame for fixing the LCM unit. Thus the production costs can be lowered, and the total thickness of the flat panel display is further minimized due to the reduction of the components. The front frame of the flat panel display having positioning structures allows the LCD panel unit to be positioned and mounted thereon along an assembly direction, and the restraining frame may be further incorporated in the flat panel display. Thus the necessary space for positioning and optical mechanism of the LCD panel unit can be retained. The optical films, the light guide component, the backlight unit, and the reflective film of the flat panel display are then mounted sequentially along the assembly direction on the restraining frame or the front frame, wherein the backlight unit and/or the reflective film could also be fixed to the back cover of the backlight module in advance. Finally, the speaker, the wiring of the display, the circuit boards, and the board cover are assembled to the front frame and the back cover, and the support stand is assembled to the flat panel display.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A flat panel display, comprising:
a front frame comprising a first positioning member, a second positioning member and a third positioning member, the first positioning member, the second positioning member and the third positioning member being arranged along a direction, and a span of the third positioning member along a horizontal direction being larger than a span of the second positioning member;
a panel unit mounted along the direction into the first positioning member of the front frame;
a plurality of optical films fixed along the direction to the second positioning member of the front frame;
a backlight unit, the backlight unit being a side-light type light emitting diode; and
a back cover fixed to the third positioning member of the front frame, the backlight unit being inserted into the third positioning member, wherein the back cover and the backlight unit are fixed to the front frame along the direction.

2. The flat panel display of claim 1, wherein a span of the second positioning member of the front frame along a horizontal direction is larger than a span of the first positioning member.

3. The flat panel display of claim 1, wherein the flat panel display further comprises a reflector disposed onto the second positioning member.

4. The flat panel display of claim 1, further comprising a light guide component and a reflector for being disposed on the plurality of optical films along the direction.

5. The flat panel display of claim 1, further comprising two cushion pads respectively disposed along the direction at two sides of the panel unit.

6. A method for assembling a flat panel display, the method comprising:
   mounting a panel unit into a first positioning member of a front frame along a direction;
   fixing a plurality of optical films into a second positioning member of the front frame along the direction;
   fixing a back cover and a backlight unit to a third positioning member of the front frame along the direction; and
   inserting the backlight unit into the third positioning member after fixing the back cover to the third positioning member of the front frame;
   wherein the first positioning member, the second positioning member, and the third positioning member are arranged along the direction.

7. The method of claim 6 further comprising step of: fixing a reflector onto the second positioning member.

8. The method of claim 6 further comprising step of: disposing a light guide component and a reflector onto the plurality of optical films along the direction.

9. The method of claim 6 further comprising step of: disposing cushion pads respectively at two sides of the panel unit along the direction.

* * * * *